United States Patent Office 3,396,674
Patented Aug. 13, 1968

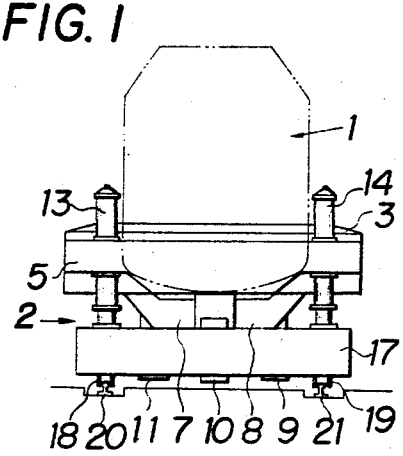
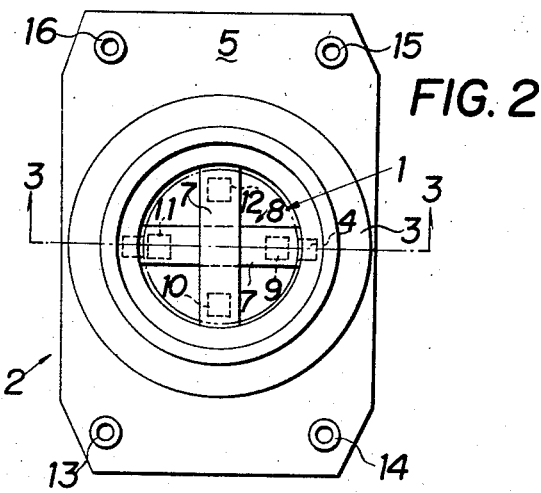
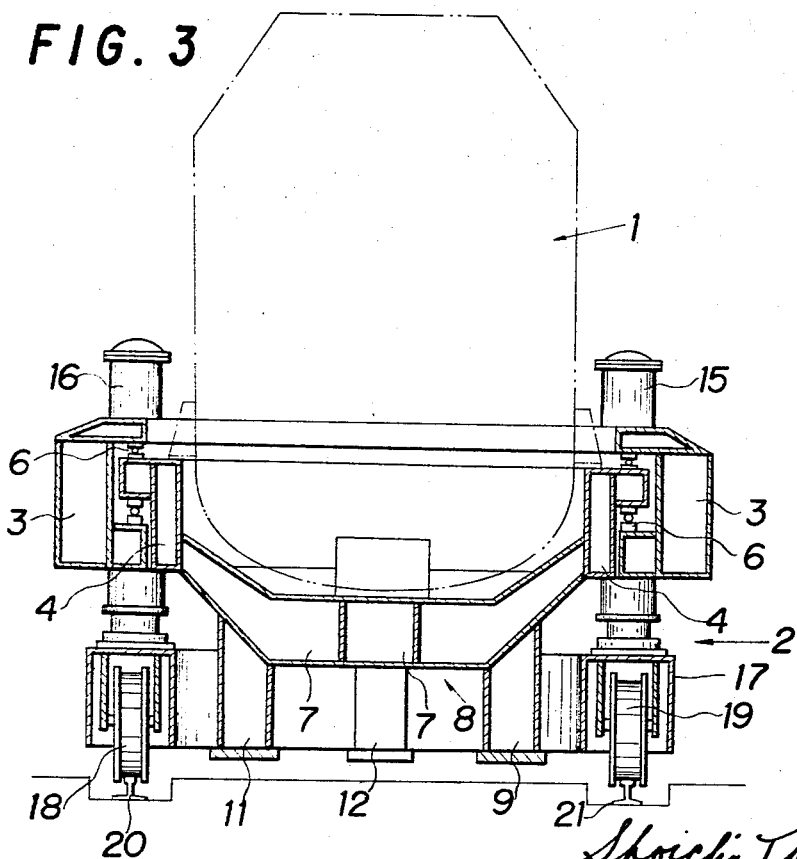

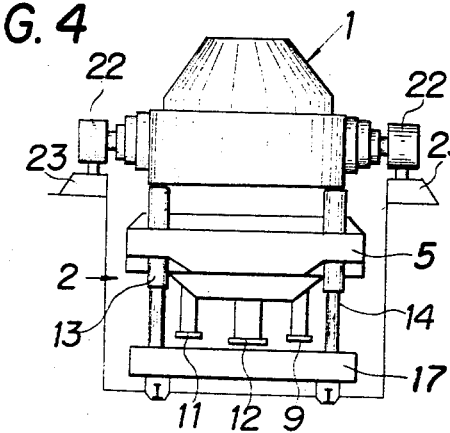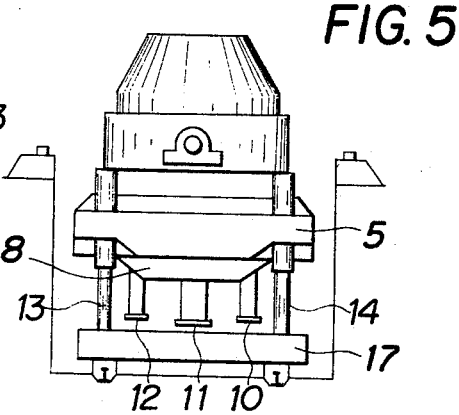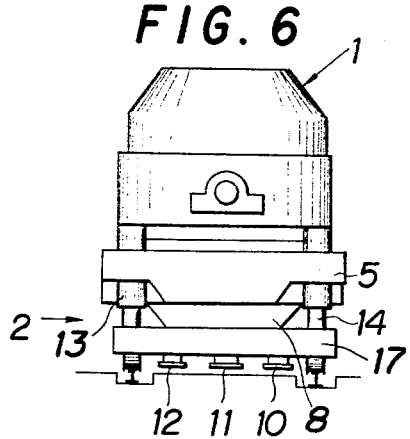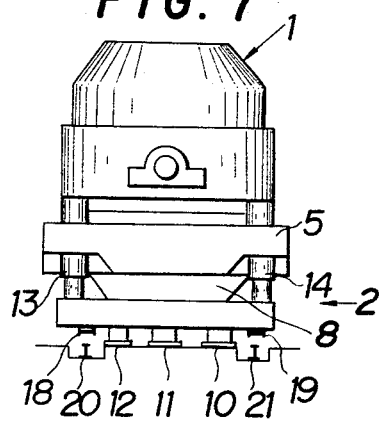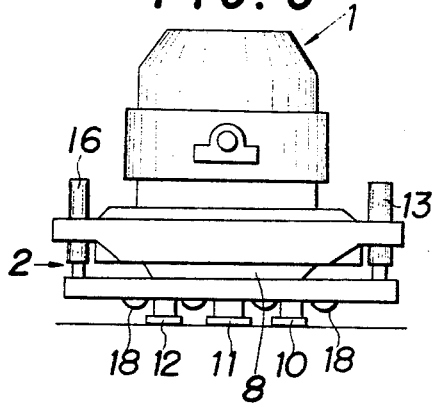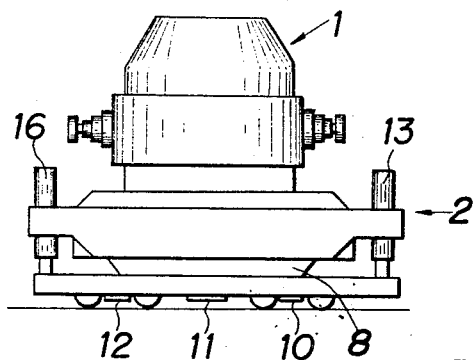

3,396,674
ELEVATABLE AND ROTATABLE
RAILWAY TRUCK
Shoichi Tani, Kitakyushu, Japan, assignor to Yawata
Iron & Steel Co., Ltd., Tokyo, Japan, a corporation
of Japan
Filed Dec. 27, 1966, Ser. No. 605,030
3 Claims. (Cl. 105—157)

ABSTRACT OF THE DISCLOSURE

A truck for carrying a heavy object, such as a converter for steel, said truck comprising a wheel frame having wheels mounted in fixed positions thereon for rotation in only one direction, a set of extensible pressure exerting devices mounted only on said wheel frame and extensible in the vertical direction and capable of drawing the wheel frame upwardly, an upper frame mounted on the upper end of said devices and movable up and down by said devices, a heavy object supporting frame rotatably mounted on said upper frame for rotation in a horizontal plane and having a heavy object support on the upper part thereof and struts extending downwardly from the bottom thereof, the struts being sufficiently long so that when the object supporting frame is lowered until the struts contact the ground, the wheel frame can be drawn upwardly to lift the wheels clear of the surface on which they roll, whereby the wheel frame and upper frame can be turned around the object supporting frame.

The present invention relates to an elevatable and rotatable railway truck for carrying a container such as a converter or a ladle.

A conventional truck used on a railway for carrying a container as mentioned above is equipped with a ring-shaped frame for supporting a converter or the like. The supporting device is set on the truck so as to be vertically movable by means of a pressure apparatus. A defect of such a truck is that when it runs on a railway, as is convention, its direction can be changed by means of nothing but a turntable installed on the railway.

The converter operation in a typical steel works will be explained hereunder by way of example. Converters are arranged in a line. To one side of the converters thus arranged, there are converter brick work stands, and converter stand-by stands. The converters are each carried from the converter operating position to the brick work position for relining, and then to the converter stand-by stands. Accordingly, the railway for the trucks must be furnished with intersections corresponding in number to the converters and the stands.

The above-mentioned prior art truck requires a turntable at each of the intersections so that the equipment is very complicated and very expensive.

An object of this invention is to provide a truck which overcomes the above described drawbacks, and contemplates a truck for carrying a converter or a container similar to the former in which, while the truck remains on the rails, the converter or the like mounted on the truck can be vertically moved and turned and that the direction of the truck can be changed by turning the truck alone.

Another object of the present invention is to provide a truck for carrying a converter or the like which not only makes it extremely easy to position the truck and the converter mounted on the truck but also can undergo a change of direction without necessitating the provision of a turntable.

The features of this invention will be more fully understood from the following description taken in conjunction with the accompanying drawings, in which:

FIG. 1 is a front view of a truck according to the present invention;

FIG. 2 is a plan view of the truck shown in FIG. 1;

FIG. 3 is a sectional view taken along the line 3—3 in FIG. 2; and

FIGS. 4, 5, 6, 7, 8 and 9 illustrate the operation of the truck.

As shown in FIGS. 1, 2 and 3, the present invention is a truck for carrying a converter or a container similar thereto which is characterized by having an upper frame 5 and a wheel frame 17 which are vertically moveable relative to each other by means of pressure devices 13, 14, 15 and 16 and a converter supporting frame 8 equipped with struts 9, 10, 11 and 12 and mounted on the upper frame 5 so as to be horizontally rotatable.

An embodiment of the invention will now be described in detail in connection with the drawings. A converter is taken as an example of the container to be carried. Referring to FIGS. 1, 2 and 3, the reference numeral 1 denotes the converter, the numeral 2 represents a truck, and the numerals 20 and 21 designate a pair of rails. The truck 2 is constructed in the following manner.

The pressure devices, for example hydraulic cylinders 13, 14, 15 and 16 are fixed on the wheel frame 17 equipped with running wheels 18 and 19, and the upper frame 5 is fastened to the pressure devices. The upper frame 5 has a ring frame 3. The converter supporting frame 8 is mounted in the ring frame 3 on a plurality of ball bearings 6 so as to be horizontally rotatable. The supporting frame 8 includes a crossed box-beam frame 7 curved to receive the bottom of the converter 1, and an annular converter support 4 is attached to the ends of the box-beam frame 7. A ball bearing receiver is mounted to the outside of the support 4. The square struts 9, 10, 11 and 12 are fixed to the bottom of the frame 7. Accordingly, the converter supporting frame 8 furnished with the struts 9, 10, 11 and 12 can be horizontally rotated with respect to the upper frame 5 and vertically moved together with the frame 5. When the struts 9, 10, 11 and 12 are in contact with the ground, the wheel frame 17 also can be vertically raised by means of the pressure devices and horizontally turned along with the upper frame 5.

The operation of a truck according to present invention will be described hereunder:

FIG. 4 illustrates the truck 2 with the converter 1 in its operating position. The truck 2 is positioned under the converter 1 mounted on bearing stands 23 on trunnion bearings 22. By raising the upper frame 5 by means of the pressure devices 13, 14, 15 and 16, the converter supporting frame 8 is lifted until the converter support 4 comes into contact with the engaging portion of the converter 1.

Then, the converter 1 is further raised by means of the pressure devices so that the converter 1 is disengaged from the bearing stands 23, and then the converter supporting frame 8 is horizontally turned to the position shown in FIG. 5.

Next, as shown in FIG. 6, the pressure devices are operated to lower the upper frame 5 in order to bring the center of gravity of the converter 1 down for stability, and the truck 2 is moved in the desired direction and stopped at the spot where the truck 2 should change its running direction. The upper frame 5 is lowered until the struts 9, 10, 11 and 12 come into contact with the ground.

That is to say, the converter 1 is supported on the ground through the converter supporting frame 8 and the struts 9, 10, 11 and 12.

Then the pressure devices are actuated to lift the wheel frame 17 with the result that the wheels 18 and 19 are lifted from the rails 20 and 21 as shown in FIG. 7. This allows the upper frame 5 to be horizontally rotated through an angle suitable for the subsequent progress of the truck 2, as seen in FIG. 8. Since the wheel frame 17 is connected with the upper frame 5 through the pressure devices, both frames 17 and 5 turn together around the converter supporting frame 8.

After thus positioning the wheel frame 17, the pressure devices are operated to lower the wheel frame 17 so that the wheels 18 and 19 ride on the rails 20 and 21 in the intended direction. Then, the converter supporting frame 8 is lifted by means of the pressure devices so that the struts 9, 10, 11 and 12 are raised from the ground, and then the converter supporting frame 8 is rotated. (Refer to FIG. 9.) This completes the direction change, and the converter 1 is ready for the succeeding advance.

As described above, in the truck of the present invention the converter supporting frame 8 equipped with the struts 9, 10, 11 and 12 and the wheel frame 17 are separately formed and combined through the ball bearings 6, the upper frame 5 and the pressure devices 13, 14, 15 and 16. Therefore, when the wheels 18 and 19 ride on the rails 20 and 21, the supporting frame 8 can be freely rotated and moved vertically, whereas when the struts are in contact with the ground the wheel frame 17 can be freely swiveled and moved in the vertical direction. Thus, the converter 1 can be shifted, moved vertically and rotated horizontally with effortless ease in converter operation, converter relining or the like so that the efficiency of operation is greatly increased. Moreover, since only the wheel frame 17 is turned at a direction changing position while the converter 1 remains in contact with the ground it is extremely easy to subject the running wheels 18 and 19 to a change in direction of movement without using a turntable. This will have an exceptionally good effect on converter operation.

While the present invention has been described with particular reference to converter operation, it will be understood that the description should be taken as illustrative of the invention and not in the limiting sense and that the apparatus of the invention can be used also to carry any container similar to a converter, especially a very heavy container.

What I claim is:

1. A truck for carrying a heavy object, such as a converter for steel, said truck comprising a wheel frame having wheels mounted in fixed positions thereon for rotation in only one direction, a set of extensible pressure exerting devices mounted only on said wheel frame and extensible in the vertical direction and capable of drawing the wheel frame upwardly, an upper frame mounted on the upper end of said devices and movable up and down by said devices, a heavy object supporting frame rotatably mounted on said upper frame for rotation in a horizontal plane and having a heavy object support on the upper part thereof and struts extending downwardly from the bottom thereof, the struts being sufficiently long so that when the object supporting frame is lowered until the struts contact the ground, the wheel frame can be drawn upwardly to lift the wheels clear of the surface on which they roll, whereby the wheel frame and upper frame can be turned around the object supporting frame.

2. A truck as claimed in claim 1 in which said pressure exerting devices are hydraulic cylinders and rams.

3. A truck as claimed in claim 1 in which said upper frame has ball bearings thereon and said object supporting frame has a ring shaped member thereon running in said ball bearings.

References Cited
UNITED STATES PATENTS

| | | | |
|---|---|---|---|
| 1,189,501 | 7/1916 | Smith | 105—177 |
| 3,312,544 | 4/1967 | McCready et al. | 105—177 XR |

ARTHUR L. LA POINT, *Primary Examiner.*

H. BELTRAN, *Assistant Examiner.*